United States Patent
Barbee et al.

(10) Patent No.: US 8,735,500 B2
(45) Date of Patent: May 27, 2014

(54) HYDROCARBON POLYMER MODIFIERS

(75) Inventors: Thomas R. Barbee, Kingwood, TX (US); Edward J. Blok, Wadsworth, OH (US); Anthony J. Dias, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/821,715

(22) PCT Filed: Aug. 17, 2011

(86) PCT No.: PCT/US2011/048052
§ 371 (c)(1),
(2), (4) Date: Apr. 4, 2013

(87) PCT Pub. No.: WO2012/050658
PCT Pub. Date: Apr. 19, 2012

(65) Prior Publication Data
US 2013/0211027 A1    Aug. 15, 2013

Related U.S. Application Data

(60) Provisional application No. 61/392,765, filed on Oct. 13, 2010.

(51) Int. Cl.
*C08L 45/00* (2006.01)
*C08F 232/08* (2006.01)
*C08F 4/14* (2006.01)

(52) U.S. Cl.
USPC ........... 525/211; 525/192; 525/241; 526/283; 526/290

(58) Field of Classification Search
USPC .................... 526/283, 290; 525/192, 211, 241
See application file for complete search history.

(56) References Cited

U.S. PATENT DOCUMENTS 4,157,363 A * 6/1979 Hepworth ..................... 525/211
5,171,793 A * 12/1992 Johnson et al. ............ 525/332.1
2009/0186965 A1 7/2009 Rodgers et al.

FOREIGN PATENT DOCUMENTS

WO         98/57999       12/1998
WO       2009/091490       7/2009

* cited by examiner

*Primary Examiner* — Fred M Teskin

(57) ABSTRACT

A hydrocarbon polymer modifier (HPM) having high softening point and high aromaticity, is an interpolymer of (i) a piperylene component; (ii) an aromatic component; and (iii) a cyclic pentadiene component comprising a dicyclopentadiene fraction (DCPD fraction) and a dimethylcyclopentadiene fraction (MCPD fraction), wherein a weight ratio of the MCPD fraction to the DCPD fraction is from 0.8 to 20, and wherein the MCPD fraction is at least 20 wt % of the cyclic pentadiene component. In a method, the proportions of (i), (ii), (iii), and an optional amylene component are adjusted to control aromaticity, softening point and Mz of the HPM. An elastomeric composition incorporates the HPM.

25 Claims, No Drawings

HYDROCARBON POLYMER MODIFIERS

PRIORITY CLAIM

This application is a National Stage Application of International Application No. PCT/US2011/048052 filed Aug. 17, 2011, which claims priority to and the benefit of U.S. Provisional Application Ser. No. 61/392,765, which was filed Oct. 13, 2010, both of which are fully incorporated herein by reference in their entireties.

CROSS REFERENCE TO RELATED APPLICATION(S)

This patent application is related to U.S. application Ser. No. 12/345,154, filed Dec. 29, 2008, which claims priority to and the benefit of U.S. Provisional Application Ser. No. 61/022,122, filed Jan. 18, 2008. This patent application is also related to U.S. Provisional Application Ser. No. 61/392,751, entitled "Hydrocarbon Polymer Modifiers for Elastomeric Compositions" filed Oct. 13, 2010.

BACKGROUND (1) Field of the Invention

This invention relates to hydrocarbon polymer modifiers and their use in elastomeric compositions. More particularly, this invention relates to hydrocarbon polymer modifiers having a balance of properties including molecular weight, softening point, and aromaticity.

(2) Description of Related Art Including Information Disclosed Under 37 CFR 1.97 and 1.98

Hydrocarbon resins are used in a variety of applications. In elastomeric compositions, for example, hydrocarbon resins are used as a processing aid and to improve the characteristics of elastomeric composition, e.g., in tire components, such as treads and sidewalls, hoses, belts, footwear components, and vibration isolation devices. The selection of ingredients for the commercial formulation of an elastomeric composition depends upon the balance of properties desired, the application, and the end use for the particular application.

Generally, the raw ingredients and materials used in tire compounding impact all tire performance variables, thus, the ingredients must be compatible with the rubbers, not interfere with cure, be easily dispersed in all tire compounds, be cost effective, and not adversely impact tire performance. Rolling resistance, dry and wet skid characteristics, heat buildup, and so on, are important performance characteristics, as well as the ability to improve the endurance of tires used in a wide variety of conditions, such as is required for agricultural tires, aircraft tires, earthmover tires, heavy-duty truck tires, mining tires, motorcycle tires, medium truck tires, and passenger car tires. On the other hand, maintaining ease of processability of the uncured elastomeric composition is also of significant importance. Additionally, the goals of improving air impermeability properties, flex fatigue properties, and the adhesion of the elastomeric composition to adjoining tire components without affecting the processability of the uncured elastomeric composition or while maintaining or improving the physical property performance of the cured elastomeric composition still remain.

Conventionally, various processing oils, such as naphthenic, paraffinic, and aromatic oils, have been added to most tire components to aid compound processing. Aromatic oil has been preferred due to its processing effectiveness and beneficial secondary properties, e.g., adhesion. However, these processing oils, particularly aromatic oils containing distilled aromatic extracts, are being replaced due to health, safety, and environmental concerns. Current industry PAH (polycyclic aromatic hydrocarbon) oil replacement options, such as treated distillate aromatic extracts ("TDAE") and mild extract solvates ("MES"), are limited in supply and have shown deficiencies, such as reduced dynamic properties, reduced tire wet traction performance, reduced tear strength, and reduced tire durability. For example, tire component-to-component adhesion may be less with TDAE and MES than with conventional aromatic oils. Therefore, a need exists for better replacements for processing oils in tire and tire tread compounds which will maintain beneficial compounding properties without adversely impacting tire performance.

It is known to improve rubber compounding with resins which are compatible or soluble in the rubber base, and which have a high softening point and low molecular weight. With some elastomers, however, the resin requires a relatively high aromatic content for compatibility. The aromatic compounds, however, tend to reduce the softening point of the resin. The softening point can be elevated by using a higher cyclics content, but this leads to undesirably increased and/or broadened molecular weight and agglomeration of the resin pellets.

There is a need for a resin with a balance of properties including softening point, Tg, aromaticity, molecular weight, and molecular weight distribution.

SUMMARY

The present invention provides a hydrocarbon polymer modifier ("HPM") which can be useful, for example, in an elastomeric composition. Elastomeric compositions comprising the HPM are useful in a variety of applications, such as pneumatic tire components, hoses, belts, solid tires, footwear components, rollers for graphic arts applications, vibration isolation devices, pharmaceutical devices, adhesives, sealants, protective coatings, and bladders for fluid retention and curing purposes. The HPM in an embodiment can be prepared having a balance of aromaticity, softening point (SP) or glass transition temperature (Tg), molecular weight, and molecular weight distribution.

In one embodiment, a hydrocarbon polymer modifier comprises an interpolymer of (i) a piperylene component; (ii) an aromatic component, preferably a styrenic component such as styrene or α-methylstyrene; and (iii) a cyclic pentadiene component comprising a dicyclopentadiene fraction (DCPD fraction) and a dimethylcyclopentadiene fraction (MCPD fraction). The DCPD fraction consists of any cyclopentadiene, cyclopentadiene dimers or codimers other than CPD-MCPD codimers, and the MCPD fraction consists of any methylcyclopentadiene, methylcyclopentadiene dimers or codimers, including any CPD-MCPD codimers.

In an embodiment, the hydrocarbon polymer modifier described above is present in an elastomeric composition comprising at least one elastomer.

In an embodiment, a method comprises melt processing the elastomeric composition with a cure package to form a curable elastomeric composition in the shape of an article, and curing the elastomeric composition to form the article.

In an embodiment, a method comprises contacting a monomer mixture of (i) a piperylene component; (ii) a cyclic pentadiene component comprising a dicyclopentadiene fraction (DCPD fraction) and a dimethylcyclopentadiene fraction (MCPD fraction), wherein the DCPD fraction consists of any cyclopentadiene dimers or codimers other than CPD-MCPD codimers, and the MCPD fraction consists of any methylcyclopentadiene dimers or codimers, including any CPD-MCPD codimers, and wherein a weight ratio of the MCPD fraction to the DCPD fraction is from 0.8 to 20 in one embodiment, and from 1 to 10 in another embodiment, wherein the MCPD fraction is at least 20 wt % of the cyclic pentadiene component; and (iii) an aromatic component; with (iv) a carbocationic catalyst, to obtain an interpolymer comprising (a) a softening point from 40° to 160° C., (b) Mn greater than 400, (c) Mz less than 15,000, and (d) at least 8 mole percent aromatic hydrogen, based on the total moles of hydrogen in the interpolymer; and recovering the interpolymer.

DETAILED DESCRIPTION OF THE PREFERRED EMBODIMENTS

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The term "phr" means parts per hundred parts of rubber by weight, and is a measure common in the art wherein components of a composition are measured relative to the total of all of the elastomer (rubber) components. The total phr or parts for all rubber components, whether one, two, three, or more different rubber components are present in a given recipe is always defined as 100 phr. Other non-rubber components are generally proportional to the 100 parts of rubber and the relative amounts may be expressed in phr.

All hydrocarbon polymer modifier (HPM) component percentages listed herein are weight percentages, unless otherwise noted. "Substantially free" of a particular component in reference to a composition is defined to mean that the particular component comprises less than 0.5 weight percent in the composition, or more preferably less than 0.25 weight percent of the component in the composition, or most preferably less than 0.1 weight percent of the component in the composition.

The term "elastomer" as used herein refers to any polymer or combination of polymers consistent with the ASTM D1566 definition, incorporated herein by reference. As used herein, the term "elastomer" may be used interchangeably with the term "rubber."

As used herein, "immiscibility" is present when experimental techniques to observe the glass transition temperature (Tg) show distinct separate and independent peaks for the elastomer and the interpolymer. Miscible systems on the other hand generally result in a single Tg peak which is shifted from the Tg peak for the elastomer alone, or which has a shoulder, due to the presence of the miscible interpolymer in the elastomer phase. Tg can be determined by differential scanning calorimetry ("DSC").

In an embodiment, the hydrocarbon polymer modifier is an interpolymer of (i) a piperylene component; (ii) an aromatic component; and (iii) a cyclic pentadiene component. The cyclic pentadiene component comprises a dicyclopentadiene fraction (DCPD fraction) and a dimethylcyclopentadiene fraction (MCPD fraction), wherein the DCPD fraction consists of any cyclopentadiene dimers and/or cyclopentadiene codimers other than CPD-MCPD, and wherein the MCPD fraction consists of any methylcyclopentadiene dimers and/or methylcyclopentadiene codimers, including any CPD-MCPD codimers. Methylcyclopentadiene codimers include codimers of methylcyclopentadiene with cyclopentadiene, piperylene, butadiene, and so on. Cyclopentadiene codimers include codimers of cyclopentadiene with piperylene, butadiene, and so on. In an embodiment, the DCPD fraction comprises at least 50 wt % of dicyclopentadiene and less than 50 wt % CPD codimers. A weight ratio of the MCPD fraction to the DCPD fraction is preferably from 0.8 to 20, more preferably 1 to 10, and the MCPD fraction is at least 20 wt % of the cyclic pentadiene component. When the proportion of the MCPD fraction exceeds about 0.8 or 1.0 times the proportion of the DCPD fraction in the cyclic component, the interpolymer can unexpectedly have a balance of softening point, molecular weights, molecular weight distribution, and aromaticity, for example, a softening point from 40° C. to 160° C., Mn greater than 400, Mw/Mn from 1.5 to 4, Mz less than 15,000, and at least 8 mole percent aromatic hydrogen, based on the total moles of hydrogen in the interpolymer, or preferably, a softening point of at least 80° C., Mn greater than 800, Mw/Mn less than 3, Mz less than 12,000, and/or at least 10 mole percent aromatic hydrogen. Mn is herein defined as the number-average molecular weight, Mw is herein defined as the weight-average molecular weight, and Mz herein defined as the z-average molecular weight.

The hydrocarbon polymer modifier in embodiments is preferably made from a monomer mixture comprising from 15 to 70% piperylene components, from 5 to 70% cyclic components, and from 10 to 30% aromatic, preferably styrenic components. Alternatively or additionally, in an embodiment, the hydrocarbon polymer modifier comprises an interpolymer of from 30 to 60% units derived from at least one piperylene component, from 10 to 50% units derived from at least one cyclic pentadiene component, and from 10 to 25% units derived from at least one styrenic component. The monomer mixture or the interpolymer may optionally comprise up to 5% isoprene, up to 10% amylene components, up to 5% indenic components, or any combination thereof. The monomer mixture is contacted with a carbocationic catalyst to interpolymerize the monomers, and the interpolymer recovered.

The elastomeric compositions of the invention can include various elastomers, hydrocarbon polymer modifiers, and fillers. Preferably, the elastomeric composition comprises from 5 to 50 phr of hydrocarbon polymer modifier or hydrocarbon polymer modifier blend. In one embodiment, a single one or a mixture of two or more of the various elastomers are generally present in the elastomeric composition at 100 phr with hydrocarbon polymer modifier being present from 5 to 50 phr.

In one embodiment, there is only one interpolymer in the hydrocarbon polymer modifier. In another embodiment, two or more interpolymers may be blended. When two or more interpolymers are used, either at least one of the interpolymers, or the resulting blended hydrocarbon polymer modifier, preferably both, may preferably comprise from 10 to 70 wt % units derived from at least one piperylene component, from 10 to 60 wt % units derived from at least one cyclic pentadiene component, and from 10 to 30 wt % units derived from at least one aromatic, preferably styrenic components. The hydrocarbon polymer modifier blend may optionally comprise up to 5% isoprene, up to 10% amylene, and up to 5% indenic components.

In one embodiment, the elastomeric composition is used in a tire, such as in the tread, or other tire component. In tire construction and model tread formulations, the elastomeric composition may comprise: 100 phr of elastomer(s); from 50 phr to 90 phr of fillers, such as, for example, carbon black and/or silica; from 5 to 50 phr of hydrocarbon polymer modifier(s); optionally, about 0.5 to 3 phr of ZnO; optionally, about 1 phr of stearic acid; optionally, about 1 to 4 phr of accelerators; optionally, about 1 to 2 phr of sulfur; optionally, up to about 5 phr of other processing aids; and optionally, depending on the application, about 0.5 to 4 phr of antidegradants.

In some embodiments, the hydrocarbon polymer modifier(s) can be used in addition to other processing aids and oils, or as a replacement for other processing aids and oils. Preferably, the elastomeric compositions are substantially free of aromatic oils. Substantially free of aromatic oils is defined to mean that the elastomeric composition comprises less than 0.5 phr of aromatic oil, or more preferably less than 0.25 phr of aromatic oil, or most preferably less than 0.1 phr of aromatic oil. Aromatic oils are compounds containing at least 35% by mass of single- and multiple-ring compounds. Generally, aromatic oils contain aromatically unsaturated polycyclic components.

In some embodiments, replacing aromatic oil with hydrocarbon polymer modifier(s) can improve compound tack, adhesion, and tear strength; improve aged tensile strength retention; improve abrasion resistance and storage modulus, G'; provide an increase in tan delta at 0° C., which can be used as a predictor for wet tire traction; provide an increase in tan delta within the range of from 30° C. to 70° C., which can be used as an indicator of dry traction, rolling resistance and other enhanced performance characteristics under normal use conditions; or provide an increase in tan delta above 70° C., which can be used as an indicator of tire grip and other enhanced performance characteristics under extreme use conditions; or any combination of any two or more or all of these improvements.

In some embodiments, the hydrocarbon polymer modifiers can be miscible or immiscible in the elastomer. Immiscibility can result, for example, where the solubility parameters of the elastomer and the HPM are sufficiently different, i.e., the HPM is incompatible with the elastomer. In another embodiment, the HPM can have a sufficiently high molecular weight to confer immiscibility in an elastomeric matrix, even where the HPM would be compatible with the elastomer mix due to similar solubility parameters and otherwise miscible if the molecular weight were lower.

In some embodiments, the HPM is cocurable or cocured with the elastomer. The HPM in one embodiment comprises olefinic unsaturation or other functionality that facilitates participation in the crosslinking or vulcanization of the rubber mixture. In one embodiment, the HPM is cocurable or cocured with a filler in the elastomeric composition, for example, with silica filler. In one embodiment, the HPM is silylated to cure with the silica filler particles. Cocuring the HPM, which can be either miscible or immiscible in the elastomer, can inhibit migration of the HPM to a surface of the cured rubber article, thus allowing the rubber composition to retain its desired properties for a longer period of time up to the useful lifetime of the article.

Hydrocarbon Polymer Modifiers ("HPM")

As used herein, reference to monomers in the HPM interpolymer is understood to refer to the as-polymerized units derived from that monomer. The terms "polymer" and "interpolymer" are used broadly herein and in the claims to refer to compounds that include, in addition to high molecular weight species that meet the lower molecular weight limits for polymers according to standard ASTM definitions, higher oligomers having a number average molecular weight (Mn) equal to or greater than 400.

HPMs can be used as elastomer compounding materials. Depending on how the HPM is compounded, optimization of rubber characteristics for rubber and tire durability, traction, and abrasion resistance can be achieved. The macrostructure (molecular weight, molecular weight distribution, and branching) of the HPM provides unique properties to the polymer additive. In one embodiment, the HPM includes a piperylene component, an aromatic component and a cyclic pentadiene component which comprises a particular dimer and codimer composition, and the HPM has a particular balance of aromaticity, softening point, molecular weight, and molecular weight distribution.

Suitable HPMs thus include both aromatic and nonaromatic components. Differences in the HPMs are largely due to the olefins in the feedstock from which the hydrocarbon components are derived. The HPM may contain "aliphatic" hydrocarbon components which have a hydrocarbon chain formed from $C_4$-$C_6$ fractions containing variable quantities of piperylene, isoprene, mono-olefins, and non-polymerizable paraffinic compounds. Such HPMs are based on pentene, butane, isoprene, piperylene, and contain varying quantities and compositional ranges of cyclic pentadienes, such as cyclopentadiene, methylcyclopentadiene and their dimers and codimers with each other and other olefins.

In an embodiment, the nonaromatic components include piperylene-based components. Piperylene components are generally a distillate cut or synthetic mixture of $C_5$ diolefins, which include, but are not limited to, cis-1,3-pentadiene, trans-1,3-pentadiene, and mixed 1,3-pentadiene. In general, piperylene components do not include branched $C_5$ diolefins such as isoprene. The piperylene component may be supplied in one embodiment as a mixed distillate cut or synthetic mixture comprising up to 20 wt % or up to 30 wt % of other components, such as, for example, 10-20 wt % cyclopentene, 10-20 wt % inert hydrocarbons, and optionally relatively minor amounts of one or more other olefins and diolefins such as 2-methylbutene-1, 2-methylbutene-2, pentene-1, pentene-2, 2-methylpentene-1, 4-methylpentene-1, 3-methylpentadiene-1,4, cyclopentadiene, hexene-1, hexene-2, hexene-3, methylcyclopentadiene, and the like. As used herein in reference to piperylene, aromatic, styrenic, amylene, cyclic pentadiene components, and the like, "inert hydrocarbons" are defined as saturated hydrocarbons or hydrocarbons which are otherwise essentially non-polymerizable in carbocationic polymerization systems, e.g., the inert compounds have a reactivity ratio relative to cyclopentadiene less than 0.01. As used herein, "minor amounts" of the other olefins and diolefins refer to less than 8 wt % of the individual olefin or diolefin, preferably less than 4 wt %, preferably less than 3 wt %, preferably less than 2 wt %, more preferably less than 1 wt %, more preferably less than 0.1 wt %, and more preferably less than 0.01 wt % by weight of the piperylene component.

In one embodiment, the HPM is prepared from a monomer mix having from 10 to 70% piperylene components, or with a range of piperylene components from any lower limit selected from 10, 20, 25, 30, 35, 40, 45, or 50% piperylene components up to any higher upper limit selected from 70, 65, 60, 55, 50, 45, 40, or 35% piperylene components, by weight of the total monomers in the monomer mixture. In a particularly preferred embodiments, the HPM is prepared from a monomer mix comprising from 30 to 65% piperylene components, or from 30 to 50% piperylene components, or from 30 to 40% piperylene components, or from 50 to 65% piperylene components.

Cyclic components are generally a distillate cut or synthetic mixture of $C_5$ and $C_6$ cyclic olefins, diolefins, dimers, codimers, and trimers, etc., therefrom. Cyclics include, but are not limited to, cyclopentene, cyclopentadiene (CPD), dicyclopentadiene (DCPD), cyclohexene, 1,3-cycylohexadiene, 1,4-cyclohexadiene, methylcyclopentadiene (MCPD), di(methylcyclopentadiene) (MCPD dimer), and codimers of CPD and/or MCPD with $C_4$'s such as butadienes, $C_5$'s such as piperylenes, and the like. A preferred cyclic is cyclopentadiene. The dicyclopentadiene may be in either the endo or exo form. The cyclics may or may not be substituted. Preferred substituted cyclics include cyclopentadienes and dicyclopentadienes substituted with a $C_1$ to $C_{40}$ linear, branched, or cyclic alkyl group, preferably one or more methyl groups. In one embodiment, the cyclic components are selected from the group consisting of: cyclopentadiene, cyclopentadiene dimer, cyclopentadiene-$C_4$ codimer, cyclopentadiene-$C_5$ codimer, cyclopentadiene-methylcyclopentadiene codimer, methylcyclopentadiene-$C_4$ codimer, methylcyclopentadiene-$C_5$ codimer, methylcyclopentadiene dimer, and cyclopentadiene and methylcyclopentadiene trimers and cotrimers, and the like, including mixtures thereof.

In one embodiment, the HPM may be prepared from a monomer mix that can include up to 60% cyclics or more or up to 50% cyclics, by weight of the monomers in the mix. Typical lower limits include at least about 0.1% or at least about 0.5% or from about 1.0% cyclics in the monomer mix. In at least one embodiment, the HPM monomer mix may include more than 5% cyclic components up to 60% cyclics, or preferably up to 55% cyclics, or more preferably up to 50% cyclics, or more preferably up to 25% or 30% cyclics, by weight of the monomers in the monomer mixture from which the HPM is prepared. In particularly preferred embodiments, the HPM monomer mixture comprises from about 10% to about 55% cyclics, or from about 10% to about 30% cyclics, or from about 15% to about 55% cyclics, or from about 15% to about 35% cyclics, or from about 30% to about 60% cyclic components.

The cyclic component may also include in an embodiment from undetectable or trace levels up to 30 wt %, e.g., from 0.1 to 20 wt %, of relatively minor amounts (as defined above) of one or a mixture of other hydrocarbons such as, for example, $C_4$ acyclics, isoprene, cis-pentadiene-1,3, trans-pentadiene-1,3, 2-methylbutene-1, 2-methylbutene-2, pentene-1, cis-pentene-2, trans-pentene-2, ethylbenzene, toluene, xylenes, styrene, or inert (i.e., saturated or non-polymerizable) hydrocarbons, or the like.

In general, the cyclic components increase the softening point of the HPM, and also usually increase the molecular weight and the breadth of the molecular weight. On the other hand, aromatics, such as styrene, tend to reduce the softening point, but the softening point decrease can be offset by increasing the relative proportion of cyclic component(s). The problem of increasing molecular weight and breadth with added cyclic components in the prior art, for example, when both a high aromatic content and a high softening point are desired, is solved in an embodiment of the present invention by using a cyclics component with higher proportion by weight of the MCPD fraction relative to the DCPD fraction. In an embodiment, the DCPD fraction comprises at least 50 wt % of dicyclopentadiene and less than 50 wt % CPD codimers.

A weight ratio of the MCPD fraction to the DCPD fraction in an embodiment is at least 0.8, preferably at least 1, e.g., from 1:1 to 10:1, preferably at least 2:1, or more preferably at least 3:1 or more preferably at least 5:1. In other embodiments, the MCPD fraction to the DCPD fraction is from 0.8:1 to 100:1, preferably from 1:1 to 100:1, or more preferably from 2:1 to 100:1, or more preferably from 3:1 to 100:1, or more preferably from 5:1 to 100:1. In still other embodiments, the MCPD fraction to the DCPD fraction is from 0.8:1 to 20:1, preferably from 1:1 to 20:1, or more preferably from 2:1 to 20:1, or more preferably from 3:1 to 20:1, or more preferably from 5:1 to 20:1. In still other embodiments, the MCPD fraction to the DCPD fraction is from 0.8:1 to 10:1, preferably from 1:1 to 10:1, or more preferably from 2:1 to 10:1, or more preferably from 3:1 to 10:1, or more preferably from 5:1 to 10:1. In an embodiment, the MCPD fraction is at least 20 wt % of the cyclic pentadiene component, preferably at least 30 wt % of the cyclic pentadiene component, or more preferably at least 40 wt % of the cyclic pentadiene component, or more preferably at least 50 wt % of the cyclic pentadiene component, or more preferably at least 60 wt % of the cyclic pentadiene component. In an embodiment, the MCPD fraction is less than 90 wt % of the cyclic pentadiene component, or less than 80 wt % of the cyclic pentadiene component, or less than 70 wt % of the cyclic pentadiene component.

In another embodiment, the HPM comprises olefinic unsaturation, e.g., at least 1 mole percent olefinic hydrogen, based on the total moles of hydrogen in the interpolymer as determined by H-NMR. In another embodiment, the HPM comprises from 1 to 20 mole percent aromatic hydrogen, or preferably from 2 to 15 mole percent aromatic hydrogen, or more preferably from 2 to 10 mole percent aromatic hydrogen. Olefinic unsaturation is beneficial to facilitate crosslinking with the elastomer component(s), for example.

In one embodiment, the HPM is substantially free of amylene component, or contains less than 1% amylene component. In another embodiment, the HPM includes an amylene component. In general, the amylene component acts as a chain transfer agent to inhibit molecular weight growth, but can also broaden the molecular weight distribution and affect the softening point or Tg. In an embodiment, the amylene component is selected from the group consisting of 2-methylbutene-1, 2-methylbutene-2, pentene-1, cis-pentene-2, trans-pentene-2 and mixtures thereof. In an embodiment, the amylene component can include up to 10 or 20 wt % of an inert hydrocarbon (as defined above), or relatively minor amounts of other olefins or diolefins. In one embodiment, the HPM is substantially free of amylene derived units. In another embodiment, the HPM monomer mix contains up to 40% amylene, or less than 30% amylene, or less than 25% amylene, or less than 20% amylene or less than 15% amylene or less than 10% amylene or less than 5% amylene, by weight of the monomers in the monomer mix. In yet another embodiment, the HPM is prepared from a monomer mix of from 0.1 up to 10% amylene, by weight of the monomers in the mixture.

In one embodiment, the HPM is substantially free of isoprene. In another embodiment, the HPM is prepared from a monomer mix that contains up to 15% isoprene, or less than 10% isoprene, by weight of the monomers in the mix. In yet another embodiment, the monomer mix contains less than 5% isoprene by weight of the monomers in the mix. In an embodiment, an isoprene component can include up to 10 or 20 wt % of an inert hydrocarbon (as defined above), or relatively minor amounts (as defined above) of other olefins or diolefins.

The HPM may also contain "aromatic" hydrocarbon structures having polymeric chains which are formed of aromatic units, such as styrene, xylene, α-methylstyrene, vinyl toluene, and indene. In one embodiment, the HPM may contain an aromatic content to match the aromatic content of the elastomer component(s) in the elastomeric composition in which it will be used, e.g., a high aromatic content in styrene rubbers, or a low aromatic content in natural rubbers, for compatibility or miscibility. Compatibility is desired, for example, where the HPM is used to change or shift the Tg of the elastomer domain, where improved dispersion of the HPM is desired, and/or where compatibility facilitates inhibition of HPM migration in the elastomeric composition.

In another embodiment, the HPM may contain an aromatic content to impart incompatibility or immiscibility with the elastomer component(s), e.g., a low aromatic content in styrene rubbers, or a high aromatic content in natural rubbers. Incompatibility may be beneficial where, for example, the HPM is not required or desired to shift or change the Tg of the elastomer phase, especially where the mobility of the HPM may be inhibited cocuring with the elastomer component(s), cocuring with the filler(s), or any combination thereof.

Preferred aromatics that may be interpolymerized in the HPM include one or more of styrene, indene, derivatives of styrene, and derivatives of indene. Particularly preferred aromatic olefins include styrene, alpha-methylstyrene, beta-methylstyrene, indene, and methylindenes, and vinyl toluenes. In general, styrenic components do not include fused-rings, such as indenics. Styrenic components include styrene, derivatives of styrene, and substituted sytrenes. In one embodiment, the aromatic component is a styrenic component that is selected from the group consisting of styrene, ortho-methyl-styrene, meta-methyl-styrene, para-methyl-styrene, alpha-methyl-styrene, t-beta-methyl-styrene, indene, methyl indene, vinyl toluene, and mixtures thereof. The aromatic or styrenic olefins in an embodiment are present in the HPM up to 60% styrenic components or up to 50%, typically from 5 to 45%, or more preferably from 5 to 30%. In particularly preferred embodiments, the HPM comprises from 10 to 25% aromatic or especially styrenic olefins.

In another embodiment, the HPM can include sufficient aromatic component to provide an aromatic hydrogen content of at least 5 mole percent aromatic hydrogen, based on the total moles of hydrogen in the interpolymer as determined by proton nuclear magnetic resonance (H-NMR). In another embodiment, the HPM comprises from 5 to 30 mole percent aromatic hydrogen, or preferably from 5 to 25 mole percent aromatic hydrogen, or more preferably from 5 to 20 mole percent aromatic hydrogen, or more preferably from 8 to 15 mole percent aromatic hydrogen.

The HPM may comprise less than 15% indenic components, or less than 10% indenic components. Indenic components include indene and derivatives of indene. In one embodiment, the HPM comprises less than 5% indenic components. In another embodiment, the HPM is substantially free of indenic components.

The HPMs in one embodiment have a novel balance of softening point, molecular weights, molecular weight distribution, and aromaticity, for example, Mn from 400 to 2000, Mw/Mn from 1.5 to 4, Mz less than 15,000, a softening point from 40° C. to 160° C., and at least 8 mole percent aromatic hydrogen, based on the total moles of hydrogen in the interpolymer, or preferably, Mn greater than 800, Mw/Mn less than 3, Mz less than 12,000, a softening point of at least 80° C. and/or at least 10 mole percent aromatic hydrogen.

Generally HPMs have a number average molecular weight (Mn) greater than about 400 g/mole, or greater than about 600 g/mole, or greater than about 700 g/mole, or greater than about 800 g/mole, or greater than about 900, or greater than about 1000 g/mole. In an embodiment the HPM has an Mn between about 400 g/mole and 2000 g/mole, or between about 800 g/mole and 1500 g/mole.

In at least one embodiment, HPMs have a weight average molecular weight (Mw) greater than about 1000 g/mole, or greater than about 1500 g/mole. In an embodiment, the HPM has a polydispersion index ("PDI", PDI=Mw/Mn) of 4 or less, or 3 or less. In a particularly preferred embodiment, the HPM has a PDI from about 1.5. The HPM may have a z-average molecular weight (Mz) less than about 15,000 g/mole, or less than about 12,000 g/mole, or less than about 10,000 g/mole. In embodiments, Mz ranges from 2000 to 15,000 g/mole, or from 2500 to 12,000 g/mole, or from 3000 to 10,000 g/mole, or from 3500 to 8,000 g/mole. Mw, Mn, and Mz may be determined by gel permeation chromatography (GPC).

In an embodiment, the HPM can have a softening point of 40° C. to 160° C., or preferably 60° C. to 160° C., or more preferably from 70° C. to 150° C., or more preferably from 80° C. to 120° C. Softening point can be determined according to the Ring & Ball Method, as measured by ASTM E-28.

In an embodiment, the HPM can have a glass transition temperature (Tg) of from about −10° C. to about 110° C., or from about 10° C. to 110° C., or from about 20° C. to 100° C., or from 30° C. to 70° C., or more preferably of from 40° C. to 55° C. Differential scanning calorimetry (DSC) may be used to determine the Tg of the HPM.

Preferred HPMs have melt viscosity of from 300 to 800 Pa-s (300-800 cPs) at 160° C., or more preferably of from 350 to 650 Pa-s at 160° C. In a particularly preferred embodiment, the HPM has a melt viscosity from 375 to 615 Pa-s at 160° C., or from 475 to 600 Pa-s at 160° C. The melt viscosity may be measured by a Brookfield viscometer with a type "J" spindle, ASTM D6267.

The resins described above may be produced by methods generally known in the art for the production of HPMs, and the invention is not limited by the method of forming the HPM. Preferably the HPM is produced by combining the olefin feed stream in a polymerization reactor with a Friedel-Crafts or Lewis Acid catalyst at a temperature between 0° C. and 200° C. Friedel-Crafts polymerization is generally accomplished by use of known catalysts in a polymerization solvent, and the solvent and catalyst may be removed by washing and distillation. The polymerization process utilized for this invention may be batchwise or continuous mode. Continuous polymerization may be accomplished in a single stage or in multiple stages.

In an embodiment, the preparation method comprises: adjusting the proportions of components in the monomer feed mixture to control the properties of the HPM, e.g., aromaticity by adjusting the proportion of the aromatic component, or the softening point by adjusting the type or amount of aromatics component or the proportion of the cyclic pentadiene component, or the molecular weight breadth by adjusting the weight ratio of the MCPD fraction to the DCPD fraction in the cyclic pentadiene component, the type of aromatics component, or the like. In one embodiment, the proportion of the aromatic component in the monomer mixture is adjusted to control the aromatic hydrogen content of the HPM to a desired target, the proportion of the cyclic pentadiene component in the monomer mixture is adjusted to control the softening point of the HPM, and then the Mz of the HPM is controlled by adjusting: (i) the weight ratio of the MCPD fraction to the DCPD fraction in the cyclic pentadiene component; (ii) a proportion of α-methylstyrene in the styrenic component from 0 to 100 percent by weight of the styrenic component; (iii) a proportion of an amylene component in the monomer mixture; or (iv) a combination thereof.

In one embodiment, the HPM is not hydrogenated (to retain the olefin unsaturation). In another embodiment, the HPM may be partially hydrogenated. The hydrogenation of the HPM may be carried out by any method known in the art, and the invention is not limited by the method of hydrogenation. For example, the hydrogenation of the HPM may be either a batchwise or a continuous process, e.g., catalytical hydrogenated. Catalysts employed for the hydrogenation of HPMs are typically supported monometallic and bimetallic catalyst systems based on elements from Group 6, 8, 9, 10, or 11 of the Periodic Table of Elements.

Elastomer

One embodiment of the elastomeric composition comprises the hydrocarbon polymer modifier (HPM) described above and at least one elastomer. Additional HPMs useful in the elastomeric composition include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments, the HPM is hydrogenated. In other embodiments, the HPM is non-polar. As used herein, non-polar means that the HPM is substantially free of monomers having polar groups.

Typical elastomers that may be included in the elastomeric compositions include butyl rubber, branched ("star-branched") butyl rubber, star-branched polyisobutylene rubber, random copolymers of isobutylene and para-methylstyrene (poly(isobutylene-co-p-methylstyrene)), polybutadiene rubber ("BR"), high cis-polybutadiene, polyisoprene rubber, isoprene-butadiene rubber ("IBR"), styrene-isoprene-butadiene rubber ("SIBR"), styrene-butadiene rubber ("SBR"), solution-styrene-butadiene rubber ("sSBR"), emulsion-styrene-butadiene rubber, nitrile rubber, ethylene propylene rubber ("EP"), ethylene-propylene-diene rubber ("EPDM"), synthetic-polyisoprene, general purpose rubber, natural rubber, and any halogenated versions of these elastomers and mixtures thereof. Useful elastomers can be made by any suitable means known in the art, and the invention is not herein limited by the method of producing the elastomer.

The elastomer may or may not be halogenated. Preferred halogenated elastomers may be selected from the group consisting of halogenated butyl rubber, bromobutyl rubber, chlorobutyl rubber, halogenated branched ("star-branched") butyl rubbers, and halogenated random copolymers of isobutylene and para-methylstyrene.

In some embodiments, the elastomeric composition comprises a blend of two or more elastomers. Blends of elastomers may be reactor blends and/or melt mixes. The individual elastomer components may be present in various conventional amounts, with the total elastomer content in the elastomeric composition being expressed as 100 phr in the formulation.

Useful elastomers include isobutylene-based homopolymers or copolymers. An isobutylene based elastomer refers to an elastomer or polymer comprising at least 70 mol % repeat units from isobutylene. These polymers can be described as random copolymers of a $C_4$ to $C_7$ isomonoolefin derived unit, such as an isobutylene derived unit, and at least one other polymerizable unit. The isobutylene-based elastomer may or may not be halogenated.

The elastomer may also be a butyl-type rubber or branched butyl-type rubber, including halogenated versions of these elastomers. Useful elastomers are unsaturated butyl rubbers, such as homopolymers and copolymers of olefins, isoolefins, and multiolefins. These and other types of useful butyl rubbers are well known and are described in RUBBER TECHNOLOGY, p. 209-581 (Morton, ed., Chapman & Hall 1995), THE VANDERBILT RUBBER HANDBOOK, p. 105-122 (Ohm ed., R. T. Vanderbilt Col., Inc. 1990), and Kresge and Wang in 8 KIRK-OTHMER ENCYCLOPEDIA OF CHEMICAL TECHNOLOGY, p. 9340955 (John Wiley & Sons, Inc. 4th ed. 1993), each of which are incorporated herein by reference. Non-limiting examples of other useful unsaturated elastomers are poly(isobutylene-co-isoprene), polyisoprene, polybutadiene, polyisobutylene, poly(styrene-co-butadiene), natural rubber, star-branched butyl rubber, and mixtures thereof.

In an embodiment, the elastomer may be at least one non isobutylene based rubber of types conventionally used in tire rubber compounding, and herein referred to as "general purpose rubber." A general purpose rubber may be any rubber that usually provides high strength and good abrasion along with low hysteresis and high resilience. These elastomers may require antidegradants in the mixed compound if they have poor resistance to both heat and ozone.

Examples of general purpose rubbers include natural rubbers ("NR"), polyisoprene rubber ("IR"), poly(styrene-co-butadiene) rubber ("SBR"), polybutadiene rubber ("BR"), poly(isoprene-co-butadiene) rubber ("IBR"), styrene-isoprene-butadiene rubber ("SIBR"), and mixtures thereof.

The elastomeric composition may also comprise rubbers of ethylene and propylene derived units, such as ethylene-propylene rubber ("EP") and ethylene-propylene-diene rubber ("EPDM"), and their mixtures. EP and EPDM are may also be considered to be general purpose elastomers. Examples of suitable termonomers in making EPDM are ethylidene norbornene, 1,4-hexadiene, dicyclopentadiene, as well as others.

In one embodiment, the elastomer may include a polybutadiene (BR) rubber. The Mooney viscosity of the polybutadiene rubber as measured at 100° C. (ML 1+4, ASTM D1646) may range from 35 to 70, or from 40 to about 65, or in another embodiment from 45 to 60.

Another useful synthetic rubber is high cis-polybutadiene ("cis-BR"). By "cis-polybutadiene" or "high cis-polybutadiene", it is meant that 1,4-cis polybutadiene is used, wherein the amount of the cis component is at least 95%.

The elastomeric composition may also comprise a polyisoprene (IR) rubber. The Mooney viscosity of the polyisoprene rubber as measured at 100° C. (ML 1+4, ASTM D1646) may range from 35 to 70, or from 40 to about 65, or in another embodiment from 45 to 60.

In another embodiment, the elastomer may also comprise a natural rubber. Natural rubbers are described in detail by Subramaniam in RUBBER TECHNOLOGY, p 179-208 (Morton, ed., Chapman & Hall, 1995), herein incorporated by reference. Desirable embodiments of the natural rubbers may be selected from technically specified rubbers ("TSR"), such as Malaysian rubbers which include, but are not limited to, SMR CV, SMR 5, SMR 10, SMR 20, SMR 50, and mixtures thereof. Preferred natural rubbers have a Mooney viscosity at 100° C. (ML 1+4, ASTM D1646) of from 30 to 120, or more preferably from 40 to 80.

In another embodiment, the elastomer may comprise a styrene rubber, such as styrene butadiene rubber ("SBR"), such as emulsion-SBR ("E-SBR"), solution SBR (S-SBR), high styrene rubber (HSR), and the like. Desirable embodiments of the SBRs may have a styrene content from 10 to 60 wt %, such as E-SBR elastomers available from JSR Corporation, which include JSR 1500 (25 wt % styrene), JSR 1502 (25 wt % styrene), JSR 1503 (25 wt % styrene), JSR 1507 (25 wt % styrene), JSR 0202 (45 wt % styrene), JSR SL552 (25 wt % styrene), JSR SL574 (15 wt % styrene), JSR SL563 (20 wt % styrene), JSR 0051, JSR 0061, or the like. Preferred SBRs have a Mooney viscosity at 100° C. (ML 1+4, ASTM D1646) of from 30 to 120, or more preferably from 40 to 80.

The elastomers useful in the invention can be blended with various other rubbers or plastics, in particular thermoplastic resins, such as nylons or polyolefins, such as polypropylene or copolymers of polypropylene. These compositions are useful in air barriers, such as bladders, tire innertubes, tire innerliners, air sleeves (such as in air shocks), diaphragms, as well as other applications where high air or oxygen retention is desirable.

Fillers and Additives

The elastomeric compositions produced in accordance with the present invention typically contain other components and additives customarily used in rubber compounds, such as effective amounts of other processing aids, pigments, accelerators, cross-linking and curing materials, antioxidants, antiozonants, fillers, and/or clays. In addition to HPM the elastomeric compositions may optionally include other useful processing aids, such as, for example, plastomers, polybutene, or mixtures thereof.

In addition to comprising at least one elastomer and at least one hydrocarbon polymer modifier, the elastomeric compositions may also optionally comprise at least one filler, for example, calcium carbonate, clay, mica, silica, silicates, talc, titanium dioxide, aluminum oxide, zinc oxide, starch, wood flour, carbon black, or mixtures thereof. The fillers may be any size and typically range, for example in the tire industry, from about 0.0001 μm to about 100 μm.

As used herein, silica is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

The elastomeric composition may also include clay. The clay may be, for example, montmorillonite, nontronite, beidellite, vokoskoite, laponite, hectorite, saponite, sauconite, magadite, kenyaite, stevensite, vermiculite, halloysite, aluminate oxides, hydrotalcite, or mixtures thereof, optionally, treated with modifying agents. The clay may contain at least one silicate. Alternatively, the filler may be a layered clay, optionally, treated or pre-treated with a modifying agent, such as organic molecules; the layered clay may comprise at least one silicate.

The silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which include saponite, hectorite, and sauconite. Also encompassed are synthetically prepared smectite-clays.

The silicate may comprise natural or synthetic phyllosilicates, such as montmorillonite, nontronite, beidellite, bentonite, volkonskoite, laponite, hectorite, saponite, sauconite, magadite, kenyaite, stevensite, and the like, as well as vermiculite, halloysite, aluminate oxides, hydrotalcite, and the like. Combinations of any of the above discussed silicates are also contemplated.

The layered filler such as the layered clays described above may be modified such as intercalated or exfoliated by treatment with at least one modifying agent. Modifying agents are also known as swelling or exfoliating agents. Generally, they are additives capable of undergoing ion exchange reactions with the cations present at the interlayer surfaces of the layered filler. The modifying agent may be added as an additive to the composition at any stage; for example, the additive may be added to the elastomer, followed by addition of the layered filler, or may be added to a combination of at least one elastomer and at least one layered filler; or the additive may be first blended with the layered filler, followed by addition of the elastomer in yet another embodiment.

In one embodiment, one or more silane coupling agents are used in the elastomeric compositions. Coupling agents are particularly desirable when silica is the primary filler, or is present in combination with another filler, as they help bind the silica to the elastomer. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane, gamma-mercaptopropyltrimethoxysilane, and the like, and mixtures thereof.

The filler may be carbon black or modified carbon black. The filler may also be a blend of carbon black and silica. In one embodiment, the elastomeric composition is a tire tread or sidewall and comprises reinforcing grade carbon black at a level of from 10 to 100 phr of the blend, more preferably from 30 to 80 phr in another embodiment, and in yet another embodiment from 50 to 80 phr. Useful grades of carbon black include the ranges of from N110 to N990.

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry.

Generally, polymer blends are crosslinked to improve the mechanical properties of the polymer. Physical properties, performance characteristics, and durability of vulcanized rubber compounds are known to be related to the number (crosslink density) and type of crosslinks formed during the vulcanization reaction. Polymer blends may be crosslinked by adding curative agents, for example sulfur, metals, metal oxides such as zinc oxide, peroxides, organometallic compounds, radical initiators, fatty acids, and other agents common in the art. Other known methods of curing that may be used include, peroxide cure systems, resin cure systems, and heat or radiation-induced crosslinking of polymers. Accelerators, activators, and retarders may also be used in the curing process.

The compositions may be vulcanized (cured) by any suitable means, such as subjecting them to heat or radiation according to any conventional vulcanization process. The amount of heat or radiation needed is that which is required to affect a cure in the composition, and the invention is not herein limited by the method and amount of heat required to cure the composition. Typically, the vulcanization is conducted at a temperature ranging from about 100° C. to about 250° C. in one embodiment, from about 150° C. to about 200° C. in another embodiment, for about 1 to about 150 minutes.

Halogen-containing elastomers may be crosslinked by their reaction with metal oxides. Examples of useful metal oxides include, but are not limited to, ZnO, CaO, and PbO. The metal oxide can be used alone or in conjunction with its corresponding metal fatty acid complex (e.g., zinc stearate, calcium stearate, etc.), or with the organic and fatty acids added alone, such as stearic acid, and optionally other curatives, such as sulfur or a sulfur compound, an alkylperoxide compound, diamines, or derivatives thereof.

Sulfur is the most common chemical vulcanizing agent for diene-containing elastomers. The sulfur vulcanization system may consist of an activator to activate the sulfur, an accelerator, and a retarder to help control the rate of vulcanization.

Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Accelerators help control the onset of and rate of vulcanization, and the number and type of crosslinks that are formed. Retarders may be used to delay the initial onset of cure in order to allow sufficient time to process the unvulcanized rubber.

The acceleration of the vulcanization process may be controlled by regulating the amount of the acceleration accelerant, often an organic compound. The mechanism for accelerated vulcanization of natural rubber, BR, and SBR involves complex interactions between the curative, accelerator, activators, and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), benzothiazyl disulfide (MBTS), N-t-butyl-2-benzothiazole sulfenamide (TBBS), N-cyclohexyl-2-benzothiazole-sulfenamide (CBS), and thioureas.

In one embodiment of the invention, at least one curing agent(s) is present from 0.2 phr to 10 phr, or from 0.5 phr to 5 phr, or in another embodiment from 0.75 phr to 2 phr.

Processing

The inventive elastomeric composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage which is conventionally called the "productive" mix stage. In the productive mix stage, the mixing typically occurs at a temperature, or ultimate temperature, lower than the mix temperature(s) of the preceding non-productive mix stage(s). The elastomers, polymer additives, silica and silica coupler, and carbon black, if used, are generally mixed in one or more non-productive mix stages. The terms "non-productive" and "productive" mix stages are well known to those having skill in the rubber mixing art.

In one embodiment, the carbon black is added in a different stage from zinc oxide and other cure activators and accelerators. In another embodiment, antioxidants, antiozonants, and processing materials are added in a stage after the carbon black has been processed with the elastomers, and zinc oxide is added at a final stage to maximize the compound modulus. In a further embodiment, mixing with the clays is performed by techniques known to those skilled in the art, wherein the clay is added to the polymer at the same time as the carbon black. In other embodiments, additional stages may involve incremental additions of one or more fillers.

In another embodiment, mixing of the components may be carried out by combining the elastomer components, filler and clay in any suitable mixing device, such as a two-roll open mill, BRABENDER™ internal mixer, BANBURY™ internal mixer with tangential rotors, Krupp internal mixer with intermeshing rotors, or preferably a mixer/extruder, by techniques known in the art. Mixing may be performed at temperatures up to the melting point of the elastomer(s) used in the composition in one embodiment, or from 40° C. to 250° C. in another embodiment, or from 100° C. to 200° C. in yet another embodiment. Mixing should generally be conducted under conditions of shear sufficient to allow the clay to exfoliate and become uniformly dispersed within the elastomer(s).

Typically, from 70% to 100% of the elastomer or elastomers is first mixed for 20 to 90 seconds, or until the temperature reaches from 40° C. to 75° C. Then, approximately 75% of the filler, and the remaining amount of elastomer, if any, are typically added to the mixer, and mixing continues until the temperature reaches from 90° C. to 150° C. Next, the remaining filler is added, as well as the processing aids, and mixing continues until the temperature reaches from 140° C. to 190° C. The masterbatch mixture is then finished by sheeting on an open mill and allowed to cool.

INDUSTRIAL APPLICABILITY

The elastomeric compositions of the invention may be extruded, compression molded, blow molded, injection molded, and laminated into various shaped articles including fibers, films, laminates, layers, industrial parts, such as automotive parts, appliance housings, consumer products, packaging, and the like.

In particular, the elastomeric compositions are useful in articles for a variety of tire applications, such as truck tires, bus tires, automobile tires, motorcycle tires, off-road tires, aircraft tires, and the like. Such tires can be built, shaped, molded, and cured by various methods which are known and will be readily apparent to those having skill in the art. The elastomeric compositions may either be fabricated into a finished article or a component of a finished article such as an innerliner for a tire. The article may be selected from air barriers, air membranes, films, layers (microlayers and/or multilayers), innerliners, innertubes, air sleeves, sidewalls, treads, tire curing bladders, and the like. The elastomeric composition may be particularly useful in a tire tread.

The elastomeric compositions of the present invention are useful in a variety of applications, particularly pneumatic tire components, hoses, belts, such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and bladders for fluid retention and curing processes. They are also useful as plasticizers in rubber formulations; as components to compositions that are manufactured into stretch-wrap films; as dispersants for lubricants; and in potting and electrical cable filling and cable housing materials.

The elastomeric compositions may also be useful in molded rubber parts and may find wide applications in automobile suspension bumpers, auto exhaust hangers, and body mounts. In yet other applications, the elastomer(s) or elastomeric compositions of the invention are also useful in medical applications such as pharmaceutical stoppers and closures and coatings for medical devices.

Accordingly, the invention provides the following embodiments:

A. A hydrocarbon polymer modifier, comprising:
an interpolymer of (i) a piperylene component; (ii) an aromatic component; and (iii) a cyclic pentadiene component comprising a dicyclopentadiene fraction (DCPD fraction) and a dimethylcyclopentadiene fraction (MCPD fraction), wherein a weight ratio of the MCPD fraction to the DCPD fraction is from 0.8:1 to 100:1, wherein the MCPD fraction is at least 20 wt % of the cyclic pentadiene component; and
wherein the interpolymer comprises (a) a softening point from 40° C. to 160° C., (b) Mn greater than 400, (c) Mz less than 15,000, and (d) at least 8 mole percent aromatic hydrogen, based on the total moles of hydrogen in the interpolymer.

B. The hydrocarbon polymer modifier of embodiment A, wherein the MCPD fraction:DCPD fraction ratio is from 2:1 to 100:1 and the aromatic hydrogen content is at least 10 mole percent.

C. The hydrocarbon polymer modifier of embodiment A or B, wherein the aromatic component comprises alpha-methyl-styrene.

D. The hydrocarbon polymer modifier of any one of the preceding embodiments, wherein the interpolymer comprises a Mw/Mn from 1.5 to 4.

E. The hydrocarbon polymer modifier of any one of the preceding embodiments, wherein the MCPD fraction comprises at least 45 wt % of the cyclic pentadiene component, and wherein the interpolymer comprises a softening point of at least 80° C., Mn greater than 800, Mw/Mn less than 3, and Mz less than 12,000.

F. The hydrocarbon polymer modifier of any one of the preceding embodiments, wherein the interpolymer further comprises an amylene component.

G. The hydrocarbon polymer modifier of any one of the preceding embodiments, in an elastomeric composition comprising at least one elastomer.

H. The elastomeric composition of embodiment G, wherein the MCPD fraction:DCPD fraction ratio is at least 2 and the aromatic hydrogen content is at least 10 mole percent.

I. The elastomeric composition of embodiment G or H, wherein the aromatic component comprises alpha-methyl-styrene.

J. The elastomeric composition of any one of embodiments G to I, wherein the MCPD fraction comprises at least 45 wt % of the cyclic pentadiene component.

K. The elastomeric composition of any one of embodiments G to J, wherein the interpolymer comprises a softening point of at least 80° C., Mn greater than 800, Mw/Mn less than 3, and Mz less than 12,000.

L. The elastomeric composition of any one of embodiments G to K, wherein the piperylene component is selected from the group consisting of: trans-pentadiene-1,3, cyclopentene, cis-pentadiene and mixtures thereof; the cyclic pentadiene component is selected from the group consisting of: cyclopentadiene, cyclopentadiene dimer, cyclopentadiene trimer, cyclopentadiene-$C_4$ codimer, cyclopentadiene-piperylene codimer, cyclopentadiene-methylcyclopentadiene codimer, methylcyclopentadiene, methylcyclopentadiene dimer, methylcyclopentadiene-$C_4$ codimer, methylcyclopentadiene-piperylene codimer, and mixtures thereof; and wherein the styrenic component is selected from the group consisting of: styrene, ortho-methyl-styrene, meta-methyl-styrene, para-methyl-styrene, alpha-methyl-styrene, t-beta-methyl-styrene, indene, methyl indene, vinyl toluene, and mixtures thereof.

M. The elastomeric composition of any one of embodiments G to L, wherein the interpolymer further comprises an amylene component.

N. The elastomeric composition of embodiment M, wherein the amylene component is selected from the group consisting of 2-methylbutene-1, 2-methylbutene-2, pentene-1, cis-pentene-2, trans-pentene-2, and mixtures thereof.

O. The elastomeric composition of any one of embodiments G to N, wherein the at least one elastomer comprises styrene-butadiene rubber.

P. The elastomeric composition of any one of embodiments G to O, wherein the hydrocarbon polymer modifier is miscible with the at least one elastomer.

Q. The elastomeric composition of any one of embodiments G to P, wherein the interpolymer is present at from 5 to 50 phr.

R. The elastomeric composition of any one of embodiments G to Q, in a tire or tire component.

S. A method, comprising:
melt processing the elastomeric composition of any one of embodiments G to R, with a cure package to form a curable elastomeric composition in the shape of an article; and
curing the elastomeric composition to form the article.

T. A method, comprising:
contacting a monomer mixture of (i) a piperylene component; (ii) a cyclic pentadiene component comprising a dicyclopentadiene fraction (DCPD fraction) and a dimethylcyclopentadiene fraction (MCPD fraction), wherein a weight ratio of the MCPD fraction to the DCPD fraction is from 0.8 to 20, wherein the MCPD fraction is at least 20 wt % of the cyclic pentadiene component; and (iii) a styrenic component; with (iv) a carbocationic catalyst, to obtain an interpolymer; and
recovering the interpolymer, wherein the recovered interpolymer comprises (a) a softening point from 40° C. to 160° C., (b) Mn greater than 400, (c) Mz less than 15,000, and (d) at least 8 mole percent aromatic hydrogen, based on the total moles of hydrogen in the interpolymer.

U. The method of embodiment T, further comprising:
adjusting a proportion of the styrenic component in the monomer mixture to control the aromatic hydrogen content of the interpolymer; and
adjusting a proportion of the cyclic pentadiene component in the monomer mixture to control the softening point of the interpolymer.

V. The method of any one of embodiments T to U, further comprising adjusting the weight ratio of the MCPD fraction to the DCPD fraction in the cyclic pentadiene component from 2 to 10 to control the Mz of the interpolymer.

W. The method of any one of embodiments T to V, further comprising adjusting a proportion of alpha-methylstyrene in the styrenic component from 0 to 100 percent by weight of the styrenic component to control the Mz of the interpolymer.

X. The method of any one of embodiments T to W, further comprising a proportion of an amylene component in the monomer mixture up to 10 percent by weight of the monomers in the monomer mixture; or (iv) a combination thereof, to control the Mz of the interpolymer.

Y. The method of any one of embodiments T to X, wherein the interpolymer is obtained from a monomer mixture comprising from 15 to 70 percent by weight of the piperylene component, from 5 to 70 percent by weight of the of the cyclic pentadiene component, and from 10 to 30 percent by weight of the aromatic component, by total weight of monomers in the monomer mixture.

EXAMPLES

The hydrocarbon polymer modifiers (HPM), and the elastomeric compositions comprising at least one elastomer and the HPM, will now be further described with reference to the following non-limiting examples.

Aromatic, olefinic, and aliphatic hydrogen content of the hydrocarbon polymer modifiers were determined by proton nuclear magnetic resonance ("H-NMR").

Molecular weight of the hydrocarbon polymer modifiers was determined by gel permeation chromatography. The techniques for determining the molecular weight (Mn, Mw, and Mz) and molecular weight distribution (MWD) are generally described in U.S. Pat. No. 4,540,753, which is incorporated herein by reference. The polydispersion index (PDI) was calculated as Mw/Mn. The melt viscosity of the hydrocarbon polymer modifiers was determined using a Brookfield viscometer with a type "J" spindle, ASTM D-6267.

The hydrocarbon polymer modifiers used in the examples are complex copolymers where the copolymer properties can be controlled by the type and amount of monomers included, i.e., the microstructure of the copolymer. Monomer placement in the polymer chain is random leading to further complexity in the polymer microstructure. The hydrocarbon polymer modifiers were prepared from a piperylene component, a styrenic component, and a cyclics component, with or without an amylene component.

The styrenic component was styrene or α-methylstyrene, and the amylene component, if used, was an isoamylene-rich amylene stream comprising a mixture of at least two of 2-methylbutene-1, 2-methylbutene-2, pentene-1, cis-pentene-2, and trans-pentene-2 in about 10-20 wt % inert (saturated or otherwise non-polymerizable) hydrocarbons.

The piperylene component was a mixed stream of cis- and trans-pentadiene-1,3, with about 10-20 wt % cyclopentene, and about 10-20 wt % inert (olefinically saturated or otherwise non-polymerizable) hydrocarbons, and optionally relatively minor amounts (less than 8 wt % each, preferably less than 4 wt % each) of one or more other olefins and diolefins, such as 2-methylbutene-1, 2-methylbutene-2, pentene-1, pentene-2, 2-methylpentene-1, 4-methylpentene-1, 3-methylpentadiene-1,4, cyclopentadiene, hexene-1, hexene-2, hexene-3, and the like.

The cyclics components were obtained from three different sources:

(1) "DCPD80," a high purity dicyclopentadiene (DCPD) stream nominally (plus or minus 10 wt %) comprising 80 wt % dicyclopentadiene and 20 wt % total of a mixture of other hydrocarbons optionally present at from undetectable or trace levels up to less than 10 wt % individually, such as $C_4$ acyclics, isoprene, cis-pentadiene-1,3, trans-pentadiene-1,3, 2-methylbutene-1, 2-methylbutene-2, pentene-1, cis-pentene-2, trans-pentene-2, ethylbenzene, toluene, xylenes, styrene, cyclopentadiene (CPD), methylcyclopentadiene (MCPD), $C_7$ aliphatics, $C_8$ aliphatics, $C_4$ dimer, CPD-butadiene codimers, CPD-piperylene codimers, MCPD dimers, MCPD-butadiene codimers, MCPD-piperylene codimers, CPD-MCPD codimers, trimers of CPD, MCPD, butadiene, piperylene, and combinations thereof, other inert (saturated or otherwise not polymerizable) hydrocarbons, and the like, and having a weight ratio (A/B) of (A) [MCPD and] MCPD dimers and codimers (including any CPD-MCPD codimers) to (B) [CPD and] CPD dimers and codimers (excluding any CPD-MCPD codimers) of less than 0.001;

(2) "MCPD40," a concentrated mixed cyclopentadiene (CPD)/methylcyclopentadiene (MCPD) dimers and codimers stream nominally (plus or minus 10 wt %) comprising 40 wt % MCPD dimers and codimers (including any MCPD dimers, MCPD-butadiene codimers, MCPD-piperylene codimers, CPD-MCPD codimers), 40 wt % (plus or minus 10 wt %) CPD dimers and codimers (including 10 to 15 wt % total of CPD-butadiene codimers and CPD-piperylene codimers, and excluding any CPD-MCPD codimers), and 20 wt % (plus or minus 10 wt %) total of a mixture of other hydrocarbons optionally present at from undetectable or trace levels up to less than 10 wt % individually, such as $C_4$ acyclics, isoprene, cis-pentadiene-1,3, trans-pentadiene-1,3, 2-methylbutene-1, 2-methylbutene-2, pentene-1, cis-pentene-2, trans-pentene-2, ethylbenzene, toluene, xylenes, styrene, $C_7$ aliphatics, $C_8$ aliphatics, $C_4$ dimers, trimers of CPD, MCPD, butadiene, piperylene, and combinations thereof, other inert (saturated or otherwise not polymerizable) hydrocarbons, and the like, and having a weight ratio (A/B) of (A) [MCPD and] MCPD dimers and codimers (including any CPD-MCPD codimers) to (B) [CPD and] CPD dimers and codimers (excluding any CPD-MCPD codimers) of from about 0.8 to about 1.2; or (3) "MCPD60," a concentrated mixed MCPD/CPD dimers and codimers stream nominally (plus or minus 10 wt %) comprising 60 wt % MCPD dimers and MCPD and CPD codimers (including any MCPD dimers, MCPD-butadiene codimers, MCPD-piperylene codimers, CPD-butadiene codimers, CPD-piperylene codimers, CPD-MCPD codimers), 10 wt % (plus or minus 10 wt %) CPD dimers, and 30 wt % (plus or minus 10 wt %) total of a mixture of other hydrocarbons optionally present at from undetectable or trace levels up to less than 10 wt % individually, such as $C_4$ acyclics, isoprene, cis-pentadiene-1,3, trans-pentadiene-1,3, 2-methylbutene-1, 2-methylbutene-2, pentene-1, cis-pentene-2, trans-pentene-2, ethylbenzene, toluene, xylenes, styrene, $C_7$ aliphatics, $C_8$ aliphatics, $C_4$ dimers, trimers of CPD, MCPD, butadiene, piperylene, and combinations thereof, other inert (saturated or otherwise not polymerizable) hydrocarbons, and the like, and having a weight ratio (A/B) of (A) [MCPD and] MCPD dimers and codimers (including any CPD-MCPD codimers) to (B) [CPD and] CPD dimers and codimers (excluding any CPD-MCPD codimers) of from about 1.5 to about 1.8.

Example 1

Hydrocarbon polymer modifiers were prepared in a lab scale continuous reactor consisting of 1500 ml glass walled reactor equipped with mechanical agitation, cooling, inlets for feed and AlCl3 catalyst. After the reactor was purged with nitrogen, the feed and catalyst are started to the reactor to maintain an average residence time of 60 minutes with 0.64-0.66 wt % AlCl3 catalyst. The reactor was maintained at 56° C.-58° C. until steady state conditions were achieved after 4 hours. The hydrocarbon polymer modifier was recovered by collecting the reactor product, quenching by addition of a water/isopropyl alcohol mixture followed by water washing steps to remove the residual catalyst. The HPM is then recovered by distilling off any unreacted monomers and solvent under a stream of nitrogen up to 250° C. followed by steam stripping to remove low molecular weight oligomers. The HPMs in this example were prepared with piperylenes, 3 wt % isoamylenes, styrene or α-methylstyrene, one of three cyclics components, DCPD80, MCPD40 or MCPD60, in a sulfolane raffinate as a solvent. The feed compositions and HPM properties are presented in Table 1.

TABLE 1

HPM Feed Compositions and Properties - Effect of Cyclics/Styrenics

|  | HPM-A | HPM-B | HPM-1 | HPM-2 | HPM-3 | HPM-4 |
|---|---|---|---|---|---|---|
| Feed Composition (wt %) | | | | | | |
| Piperylenes | 54 | 54 | 55 | 55 | 46 | 46 |
| Styrene | 17 | 0 | 15 | 0 | 15 | 0 |
| α-Methyl Styrene | 0 | 17 | 0 | 15 | 0 | 15 |
| DCPD80 | 8 | 8 | 0 | 0 | 0 | 0 |
| MCPD40 | 0 | 0 | 9 | 9 | 0 | 0 |
| MCPD60 | 0 | 0 | 0 | 0 | 18 | 18 |
| Isoamylene | 3 | 3 | 3 | 3 | 3 | 3 |
| Raffinate | 18 | 18 | 18 | 18 | 18 | 18 |
| Total | 100 | 100 | 100 | 100 | 100 | 100 |
| Yield (wt %) | | | | | | |
| HPM | 41.8 | 41.8 | 43.3 | 42.6 | 38.1 | 39.3 |
| Softening Point (° C.) | | | | | | |
| HPM | 85.1 | 80.6 | 88.9 | 88.9 | 89.2 | 87.6 |
| GPC (kg/mole) | | | | | | |
| Mn | 0.957 | 0.809 | 0.945 | 0.876 | 0.954 | 0.826 |
| Mw | 2.29 | 1.78 | 2.56 | 2.00 | 2.06 | 1.62 |
| Mz | 13.9 | 12.5 | 14.0 | 9.24 | 7.93 | 3.94 |
| Mw/Mn | 2.39 | 2.20 | 2.71 | 2.28 | 2.16 | 1.96 |
| H-NMR (mole %) | | | | | | |
| Aromatic H | 13.1 | 12.8 | 11.5 | 11.1 | 13.0 | 12.5 |
| Olefinic H | 4.5 | 4.2 | 4.3 | 4.2 | 5.1 | 4.6 |
| Aliphatic H | 82.4 | 83.0 | 84.2 | 84.7 | 81.9 | 82.9 |

The results in Table 1 show the effects of the type and amount of the cyclics composition, as well as of the styrenic component selection between styrene and α-methylstyrene. All of the HPMs in this example had a similar aromatic hydrogen content between 11.1 and 13.1 mole percent; the slight concentration of aromatics present in the MCPD40 and MCPD60 components was offset by a slight reduction in the styrene/α-methylstyrene components. When DCPD80, which contained negligible MCPD dimers and codimers, was used to make HPM-A and HPM-B, the substitution of α-methylstyrene for styrene resulted in a lower molecular weight, narrower molecular weight distribution in the HPM-B product, but there was a significant softening point reduction.

The use of MCPD40 in place of the DCPD80 cyclics component to produce HPM-1 (with styrene) and HPM-2 (with α-methylstyrene) resulted in a significantly higher softening points and slightly higher and broader molecular weight distributions relative to HPM-A and HPM-B, respectively. However, the use of styrene or α-methylstyrene had no effect on the softening point between HPM-1 and HPM-2, whereas the molecular weight was lower in HPM-2 with α-methylstyrene and the molecular weight distribution as reflected in Mw/Mn and Mz was markedly narrower.

When the high MCPD fraction cyclics component MCPD60 was used in a higher proportion of the cyclics component, the resulting hydrocarbon polymer modifiers HPM-3 and HPM-4 still had similar softening points comparable to that of HPM-1 and HPM-2; however, surprisingly, the molecular weight distributions were significantly narrower in both Mw/Mn and Mz, and the further narrowing with α-methylstyrene in place of styrene was relatively more pronounced.

Example 2

The procedures and equipment of Example 1 were used to prepare additional HPMs with DCPD80 and MCPD60, with styrene or α-methylstyrene, and with increased isoamylenes content or without isoamylenes, including one run at a very high MCPD60 feed composition (41 wt %). The feed compositions and HPM properties are presented in Table 2.

TABLE 2

HPM Feed Compositions and Properties - Effect of Cyclics/Amylenes/Styrenics

|  | HPM-C | HPM-D | HPM-5 | HPM-6 | HPM-7 |
|---|---|---|---|---|---|
| Feed Composition (wt %) | | | | | |
| Piperylenes | 52 | 52 | 49 | 49 | 27 |
| Styrene | 17 | 0 | 15 | 0 | 0 |
| α-Methyl Styrene | 0 | 17 | 0 | 15 | 14 |
| DCPD80 | 8 | 8 | 0 | 0 | 0 |
| MCPD40 | 0 | 0 | 0 | 0 | 0 |
| MCPD60 | 0 | 0 | 18 | 18 | 41 |
| Isoamylene | 5 | 5 | 0 | 0 | 0 |
| Raffinate | 18 | 18 | 18 | 18 | 18 |
| Total | 100 | 100 | 100 | 100 | 100 |
| Yield (wt %) | | | | | |
| HPM | 43.7 | 43.2 | 40.0 | 41.5 | 29.8 |
| Softening Point (° C.) | | | | | |
| HPM | 91.4 | 82.2 | 95.6 | 91.2 | 93.4 |
| GPC (kg/mole) | | | | | |
| Mn | 0.970 | 0.780 | 1.08 | 0.936 | 0.804 |
| Mw | 3.29 | 1.59 | 2.72 | 2.10 | 1.57 |
| Mz | 19.1 | 10.1 | 10.8 | 7.08 | 3.67 |
| Mw/Mn | 3.39 | 2.04 | 2.52 | 2.24 | 1.96 |
| H-NMR (mole %) | | | | | |
| Aromatic H | 13.7 | 13.2 | 13.4 | 12.7 | 15.9 |
| Olefinic H | 4.7 | 4.3 | 5.3 | 5.2 | 5.5 |
| Aliphatic H | 81.6 | 82.5 | 81.2 | 82.0 | 78.6 |

When the isoamylenes content was increased to 5 wt % of the feed composition, the softening point was increased in HPM-C (made with DCPD80, styrene) compared to HPM-A, but the molecular weights increased and the molecular weight distribution was broader. In HPM-D (DCPD80, α-methylstyrene, 5 wt % isoamylenes), the softening point reduction and molecular weight distribution narrowing effects of the α-methylstyrene were more pronounced relative to HPM-C, although there was, not unexpectedly, some softening point increase seen from the additional isoamylenes content relative to HPM-B.

Quite unexpectedly, when HPM-5 (styrene, MCPD60) and HPM-6 (α-methylstyrene, MCPD60) were prepared without any isoamylenes component, the softening point increased relative to HPM-3 and HPM-4, and moreover the broadening of the molecular weight distribution was not as severe as seen upon increasing the isoamylenes content from HPM-A and HPM-B to HPM-C and HPM-D, respectively. When the MCPD60 content was increased to 41 wt % of the feed composition in HPM-7, the softening point was comparable to HPM-5 (93.4 vs. 95.6° C.), the aromatics content increased (15.9 mole % aromatic hydrogen vs. 13.4 mole % in HPM-5), while the molecular weight remained low and the molecular weight distribution was very narrow, e.g., Mz was less than 4000 in HPM-7 vs. more than 10,000 in HPM-5 and almost 20,000 in HPM-C.

The invention has been described above with reference to numerous embodiments and specific examples. Many variations will suggest themselves to those skilled in this art in light of the above detailed description. All such obvious variations are within the full intended scope of the appended claims.

We claim:

1. A hydrocarbon polymer modifier, comprising:
an interpolymer of (i) a piperylene component; (ii) an aromatic component; and (iii) a cyclic pentadiene component comprising a dicyclopentadiene fraction (DCPD fraction) and a dimethylcyclopentadiene fraction (MCPD fraction), wherein a weight ratio of the MCPD fraction to the DCPD fraction is from 0.8:1 to 100:1, wherein the MCPD fraction is at least 20 wt % of the cyclic pentadiene component; and
wherein the interpolymer comprises (a) a softening point from 40° C. to 160° C., (b) Mn greater than 400, (c) Mz less than 15,000, and (d) at least 8 mole percent aromatic hydrogen, based on the total moles of hydrogen in the interpolymer.

2. The hydrocarbon polymer modifier of claim 1, wherein the MCPD fraction:DCPD fraction ratio is from 2:1 to 100:1 and the aromatic hydrogen content is at least 10 mole percent.

3. The hydrocarbon polymer modifier of claim 1, wherein the aromatic component comprises alpha-methylstyrene.

4. The hydrocarbon polymer modifier of claim 1, wherein the interpolymer comprises a Mw/Mn from 1.5 to 4.

5. The hydrocarbon polymer modifier of claim 1, wherein the MCPD fraction comprises at least 45 wt % of the cyclic pentadiene component, and wherein the interpolymer comprises a softening point of at least 80° C., Mn greater than 800, Mw/Mn less than 3, and Mz less than 12,000.

6. The hydrocarbon polymer modifier of claim 1, wherein the interpolymer further comprises an amylene component.

7. An elastomeric composition comprising the hydrocarbon polymer modifier of claim 1 and at least one elastomer.

8. The elastomeric composition of claim 7, wherein the MCPD fraction:DCPD fraction ratio is at least 2 and the aromatic hydrogen content is at least 10 mole percent.

9. The elastomeric composition of claim 7, wherein the aromatic component comprises alpha-methylstyrene.

10. The elastomeric composition of claim 7 wherein the MCPD fraction comprises at least 45 wt % of the cyclic pentadiene component.

11. The elastomeric composition of claim 7, wherein the interpolymer comprises a softening point of at least 80° C., Mn greater than 800, Mw/Mn less than 3, and Mz less than 12,000.

12. The elastomeric composition of claim 7, wherein the piperylene component is selected from the group consisting of: trans-pentadiene-1,3, cyclopentene, cis-pentadiene, and mixtures thereof; the cyclic pentadiene component is selected from the group consisting of: cyclopentadiene, cyclopentadiene dimer, cyclopentadiene trimer, cyclopentadiene-$C_4$ codimer, cyclopentadiene-piperylene codimer, cyclopentadiene-methylcyclopentadiene codimer, methylcyclopentadiene, methylcyclopentadiene dimer, methylcyclopentadiene-$C_4$ codimer, methylcyclopentadiene-piperylene codimer, and mixtures thereof; and wherein the aromatic component is selected from the group consisting of: styrene, ortho-methyl-styrene, meta-methyl-styrene, para-methyl-styrene, alpha-methyl-styrene, t-beta-methyl-styrene, indene, methyl indene, vinyl toluene, and mixtures thereof.

13. The elastomeric composition of claim 7, wherein the interpolymer further comprises an amylene component.

14. The elastomeric composition of claim 13, wherein the amylene component is selected from the group consisting of 2-methylbutene-1, 2-methylbutene-2, pentene-1, cis-pentene-2, trans-pentene-2, and mixtures thereof.

15. The elastomeric composition of claim 7, wherein the at least one elastomer comprises styrene-butadiene rubber.

16. The elastomeric composition of claim 7, wherein the hydrocarbon polymer modifier is miscible with the at least one elastomer.

17. The elastomeric composition of claim 7, wherein the interpolymer is present at from 5 to 50 phr.

18. The elastomeric composition of claim 7, in a tire or tire component.

19. A method, comprising:
(a) melt processing the elastomeric composition of claim 7, with a cure package to form a curable elastomeric composition in the shape of an article; and
(b) curing the elastomeric composition to form the article.

20. A method, comprising:
(a) contacting a monomer mixture of (i) a piperylene component; (ii) a cyclic pentadiene component comprising a dicyclopentadiene fraction (DCPD fraction) and a dimethylcyclopentadiene fraction (MCPD fraction), wherein a weight ratio of the MCPD fraction to the DCPD fraction is from 0.8 to 20, wherein the MCPD fraction is at least 20 wt % of the cyclic pentadiene component; and (iii) a styrenic component; with (iv) a carbocationic catalyst, to obtain an interpolymer; and
(b) recovering the interpolymer, wherein the recovered interpolymer comprises (a) a softening point from 40° C. to 160° C., (b) Mn greater than 400, (c) Mz less than 15,000, and (d) at least 8 mole percent aromatic hydrogen, based on the total moles of hydrogen in the interpolymer.

21. The method of claim 20, further comprising:
(c) adjusting a proportion of the styrenic component in the monomer mixture to control the aromatic hydrogen content of the interpolymer; and
(d) adjusting a proportion of the cyclic pentadiene component in the monomer mixture to control the softening point of the interpolymer.

22. The method of claim 20, further comprising adjusting the weight ratio of the MCPD fraction to the DCPD fraction in the cyclic pentadiene component from 2 to 10, to control the Mz of the interpolymer.

23. The method of claim 20, further comprising adjusting a proportion of alpha-methylstyrene in the styrenic component from 0 to 100 percent by weight of the styrenic component to control the Mz of the interpolymer.

24. The method of claim 20, further comprising adjusting a proportion of an amylene component in the monomer mixture up to 10 percent by weight of the monomers in the monomer mixture to control the Mz of the interpolymer.

25. The method of claim 20, wherein the interpolymer is obtained from a monomer mixture comprising from 15 to 70 percent by weight of the piperylene component, from 5 to 70 percent by weight of the cyclic pentadiene component, and from 10 to 30 percent by weight of the styrenic component, by total weight of monomers in the monomer mixture.

* * * * *